United States Patent [19]

Ilie et al.

[11] Patent Number: 5,241,162

[45] Date of Patent: Aug. 31, 1993

[54] ACCOUNTING SYSTEM FOR CONSUMABLE UNITS, WITH OPTIMIZED MANAGEMENT, NOTABLY TO ACCOUNT FOR PARKING TIME UNITS

[75] Inventors: François Ilie; Alain Marechal, both of Paris, France

[73] Assignee: Hello S.A., Paris, France

[21] Appl. No.: 820,570

[22] Filed: Jan. 14, 1992

[30] Foreign Application Priority Data

Jan. 17, 1991 [FR] France .................... 91 00655

[51] Int. Cl.⁵ .................... G07B 15/02; G04F 1/00
[52] U.S. Cl. .................... 235/384; 235/375; 368/90
[58] Field of Search ............ 235/375, 380, 382, 384; 368/90; 364/467

[56] References Cited

U.S. PATENT DOCUMENTS

| | | | |
|---|---|---|---|
| 4,443,027 | 4/1984 | McNeeley et al. ............... 283/83 |
| 4,460,965 | 7/1984 | Trehn et al. .................... 235/379 |
| 4,876,540 | 10/1989 | Berthon et al. .................. 368/90 |
| 5,003,520 | 3/1991 | Griev et al. .................... 368/90 |

FOREIGN PATENT DOCUMENTS

| | | |
|---|---|---|
| 0193635 | 9/1986 | European Pat. Off. . |
| 0197883 | 10/1986 | European Pat. Off. . |
| 0402821 | 12/1990 | European Pat. Off. . |
| 2202068 | 9/1988 | United Kingdom ........ 368/90 |

*Primary Examiner*—John Shepperd
*Assistant Examiner*—Esther H. Chin
*Attorney, Agent, or Firm*—Kinney & Lange

[57] ABSTRACT

Disclosed is a time-accounting system with optimized management. It can be applied, in particular, to accounting for paid or regulated parking times. The aim is to provide a system that enables a protected replacement of card, a management of fractions of parking units and a management of the change returned by the system, for uses in one of more local authority areas. The disclosed system is of the type comprising a memory card, a box for the reception of the card comprising a memory, wherein the storage capacity of the management memory of the box is limited to a maximum number of pre-determined parking units, and wherein transfer means provide for the transfer of the balance of parking units contained in the card towards the management memory of the box when the arithmetical total of the number of added-up units of the card balance and of the current content of the management memory of the box is smaller than or equal to the capacity of the management memory.

9 Claims, 3 Drawing Sheets

ACCOUNTING SYSTEM FOR CONSUMABLE UNITS, WITH OPTIMIZED MANAGEMENT, NOTABLY TO ACCOUNT FOR PARKING TIME UNITS

BACKGROUND OF THE INVENTION

1. Field of the Invention

The present invention relates to a time-accounting system with optimized management.

It can be applied in particular, to accounting for paid or regulated parking times.

This application is, however, not restrictive, and the invention can generally be applied when a period has to be accounted for by the gradual consumption, as and when time elapses, of a credit of parking units that have been allocated beforehand to the user.

The term "time-accounting system" refers to an apparatus constituted, for example, by a box, preferably a portable one, that is designed to be placed behind the windscreen of a vehicle and works in cooperation with a prepaid electronic ticket, for example a memory card, to decrement fee units, memorized in the card, according to the parking time. This type of device can be used to eliminate the need for fixed individual posts (of the pavement parking meter type) or posts used in common by groups of vehicles (of the type installed at the entrances to parking lots). The user automatically pays the parking fees by introducing a prepaid memory card into his box. The boxes are generally sold, loaned or given out on hire by local authorities or their agents who sell parking units in the form of cards of a different type for each distinct area of validity, in this case for each local authority. The validity of the parking can be verified by means of a display device on which there appear the various elements of information needed by the checking staff, for example the number of the parking zone selected by the user, a code identifying notably the type of card introduced by the user into the box and representing the town or city in which the parking is being done and, as the case may be, an information element indicating a situation of infringement of the rules, and the number of fee units still available in the card. The memories of the cards may be either rewritable or irreversibly written.

2. Description of the Prior Art

A device such as this is described, for example, in the French patent No. 87/06776 filed on behalf of the SOCIETE INTERNATIONAL POUR L'INNOVATION. The device described is a box designed to receive memory cards containing credits of parking units. The box has means to provide electrical coupling with each card introduced therein, and a writing circuit. This writing circuit enables the irreversible recording of an electronic memory position of the card introduced into the box, this circuit being periodically triggered under the control of a clock circuit, so that the successive recordings of the memory positions of the card introduced into the box correspond to the gradual consumption, as and when time elapses, of the credit of parking units remaining in the card.

This prior art device further includes means for the temporary memorization of parking units, located in the box. It is provided that these temporary memorizing means are able to collect a balance of parking units initially contained in a card. This corresponds, for example, to the case where the user feels that he does not have enough parking units in a first card and decides to empty the contents of this card into the temporary memory of the box, so as to insert a second card into the box and thus automatically increase the available credit of parking units in the system.

In one variant, it is also possible to provide for the contents of any card introduced into the box to get emptied into the temporary memory of the box, when the content of said card is smaller than a pre-determined number of units.

This document also provides for the use of the system in several towns or cities through the consumption of units contained in a single card. The card is purchased in one of the cities, and the system memorizes each of the successive parkings. A regular system of compensation is used to distribute the sums coming from the sale of the card among the different cities as a function of the real use of the card sold, for example as a function of the total number of hours of parking in each city.

However, this prior art system has a number of drawbacks.

Its design is based, indeed, on a certain philosophy of use that has some promising features but also certain limits. More precisely, this system proposes to satisfy two imperatives: firstly, to enable the user to use his "residual card balance", namely the little unconsumed balances and, secondly, to provide the system with a number of hours of credit sufficient to cope with any duration of parking desired by the user.

Now, accepting the latter constraint entails the drawback of making it necessary for the temporary memory of the box to have a large capacity. It may also show vulnerability to certain types of fraud.

Furthermore, this prior art system proposes a relatively complex form of management when a use involves several cities.

Finally, it does not resolve the situation where the conditions of use lead to the consumption of fractions of parking units.

The invention seeks to overcome these various drawbacks.

SUMMARY OF THE INVENTION

More precisely, an object of the invention is to provide a system that permits the emptying the contents of a card only under specific conditions.

Another aim of the invention is to enable the recovery and totalizing, for subsequent use, of fractions of consumed parking units.

An additional aim of the invention is to provide for the use of a given card in one city alone, and more generally in a given area of validity, and for the management of the balances of cards and of unused fractions of units independently for each area of validity, in one and the same box.

These aims, as well as others that shall appear hereinafter, are achieved by means of an accounting system for consumable units, notably an accounting system for parking time units, of the type comprising:

a consumable card or element comprising an electronic memory that stores a credit of consumable parking units, and a box for the reception of said card comprising, firstly, means for the irreversible writing of the memory positions of the electronic memory of said card and, secondly, an ancillary management memory, capable of collecting consumable parking units through said writing means, wherein the storage capacity of said management memory of the box is limited to a maximum number of pre-determined parking units, and wherein transfer means provide for the transfer of the balance of parking units contained in the card towards said management memory of the box when the arithmetical total of the number of added-up units of said card balance and of the current content of said management memory of the box is smaller than or equal to said capacity of the management memory.

In this way, said management memory, which can also be called a purse, can be activated only during specific circumstances.

Furthermore, according to the invention, said writing circuit effects said consumption of parking units as a function of preconfigurable parameters, wherein said preconfigurable parameters are capable of stipulating the consumption of fractions of consumable parking units, and wherein the unconsumed fractions of parking units are stored in said ancillary electronic memory.

Advantageously, according to the invention, the writing means of the box consume, on a priority basis, the parking units and or fractions of parking units contained in said management memory, before consuming the parking units contained in said card. In this way, both the transferred residues of card balances and the entire units reconstituted by the adding up of fractions of units, stored in the management memory, are consumed before the units of a new card introduced into the box.

According to a preferred characteristic, the system also includes an electronic storage memory comprising a predetermined number of distinct storage compartments, each of said compartments being capable of being assigned to the storage of the parking units and/or fractions of parking units relating to an operation for a distinct area of validity.

According to another advantageous characteristic of the invention, the system comprises at least as many distinct types of cards as distinct areas of validity, each card containing a code representing its area of validity.

Preferably, said electronic storage memory with compartments is set up in FIFO mode so that, when the number of areas of validity for which parking units and/or fractions of parking units that are to be stored exceeds the number of compartments of said memory, said memory eliminates the storage of parking units or fractions of parking units from the compartment corresponding to the area of validity that has had the most long-standing presence in the memory of the box, and/or includes the smallest number of memorized units and/or has the lowest frequency of use.

Advantageously, each of said compartments is referenced by an indicator of "newness of presence" in the EEPROM, the number of the indicator representing the "oldness" or "seniority" of the last use of the corresponding compartment in relation to the other compartments, and in the event of excess, the compartment assigned the indicator representing the greater degree of oldness is released.

BRIEF DESCRIPTION OF THE DRAWINGS

Other features and advantages of the invention shall appear from the following description of a preferred embodiment of the invention, given by way of a non-restrictive illustration, and from the appended drawings, of which.

Figure 1:
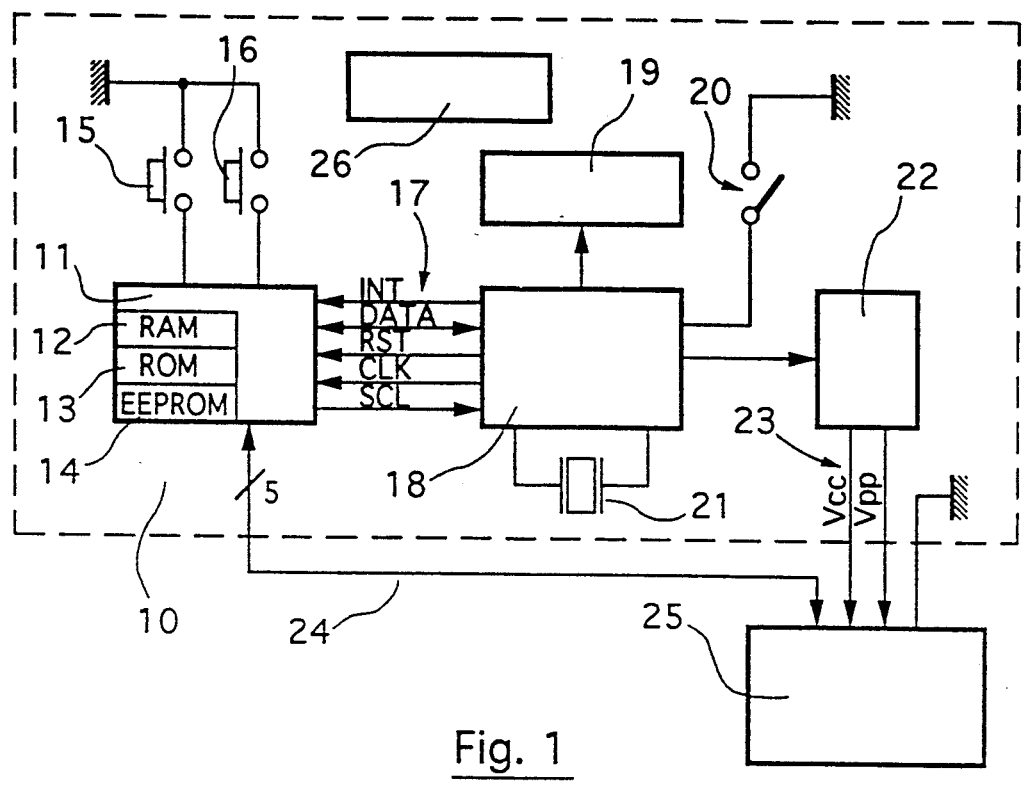
FIG. 1 is a block diagram illustrating the main functional modules of a system according to the invention.

The embodiment described here below corresponds to a box that works in cooperation with microprocessor cards and is designed to form a portable parking meter.

DETAILED DESCRIPTION OF THE INVENTION

The system according to the present invention uses an electronic system 10, preferably fitted into a portable box cooperating with an element or card 25 containing consumable credit units. The electronic system 10 includes a microcontroller 11 incorporating a RAM 12, a ROM 13 and an electrically erasable programmable ROM 14. The microcontroller 14 is, for example, a circuit of the MOTOROLA 6805 (registered name) group. The RAM 12 is used to memorize the computation parameters during the operation of the device, the ROM 13 to memorize computation algorithm type confidential data and the EEPROM 14 to memorize notably parking units and fractions of parking units as shall be explained hereinafter. The EEPROM 14 may also, inter alia, memorize data used to modify the oscillation frequency of a quartz element 21, define instructed values for the generation of specific voltages (for the supply of the element 25) or data elements relating to a secret key or to a checking of the recent operation of the system (see for example the patent applications Nos. 90 16253 and 90 16254 filed on behalf of the same applicant).

The EEPROM 14, according to a specific embodiment, has a size of 256 bytes.

The microcontroller 11 interfaces with an application specific integrated circuit (ASIC) through five lines 17. The ASIC 18 is, for example, of the FULL CUSTOM type. The line INT sends the microcontroller 11 an interruption information element corresponding to the insertion or removal of the element 25 into or from the element 25 in the device 10 (the activation of the microcontroller). Furthermore, an interruption is generated every minute, the time unit being one minute, and when the element 25 activates the limit switch 20 of the element 25 in the box. The two lines DATA and SCL convey the information elements exchanged between the two circuits. The line RST is a line for resetting the microcontroller 11 in the initial state, and the line CLK conveys the clock signal for the microcontroller 11. Furthermore, the ASIC is fitted out with a real-time clock driven by the quartz element 21 connected to the ASIC 18. The quartz element oscillates advantageously at 32 kHz.

The ASIC 18 also manages display means 19, for example means constituted by a liquid crystal display screen. The screen 19 notably enables the display of the current time (hour and minutes), the permitted parking time limit, the number of payment credit units available on the element 25 and the parking zone. The parking zone may be modified by the user by the activation of keys 15 and 16 placed preferably on top of the box enclosing the electronic circuitry 10. The choice of one parking zone rather than another modifies the number of consumable units debited from the element 25 and hence provides for matching the payment system with different zones having different hourly parking tariffs. According to one embodiment, the user has the choice between different zones displayed in the form of hexadecimal figures.

The ASIC 18 gives a supply to a voltage-raising module 22 giving a voltage Vcc and a voltage Vpp to the element 25, necessary for its operation. The supply of the complete system is provided by supply means 26 which are advantageously constituted by a set of batteries so that the box can be portable. The voltages 23 are given to the element 25 in relation to a common ground. Five communications lines 24 connect the microcontroller 11 to the element 25. The element 25 advantageously takes the form of a credit card and includes an input-output port and a PROM type memory memorizing a number of fee units that are preferably consumable in an irreversible manner.

The keys 15 and 16 enable the user to set the current time and date by simultaneously pressing the two keys 15 and 16 when he inserts a card 25 into the box to activate an updating of the time and date. The screen 19 then makes a successive display, at four-second intervals, of the year, then the month, then the day of the week and day of the month, and then the hour and finally the minutes. It is then enough to press one of the two keys 15 and 16 to increment or decrement the data element displayed. The device may advantageously take account of the changing to summer time and winter time.

According to the invention, the EEPROM 14 enables the memorizing of the "purses", each assigned to a city or town that issues parking cards. These purses may fulfil at least one of the following functions:

they store the change resulting from the consumption of parking units, during parking operations;

they enable the collection of the "residual balances" of parking cards, namely the few units that remain when the card is practically all used up, so as to facilitate the changing from one card to another.

Furthermore, to prevent fraud, these purses which form ancillary electronic memories have two characteristics:

they are of limited capacity (for example limited to seven parking units) and can therefore collect card "residual balances" only when these cards are really practically all used up;

the system consumes first of all the units and fractions of units stored in the purse before consuming those contained in the card.

Figure 2A:
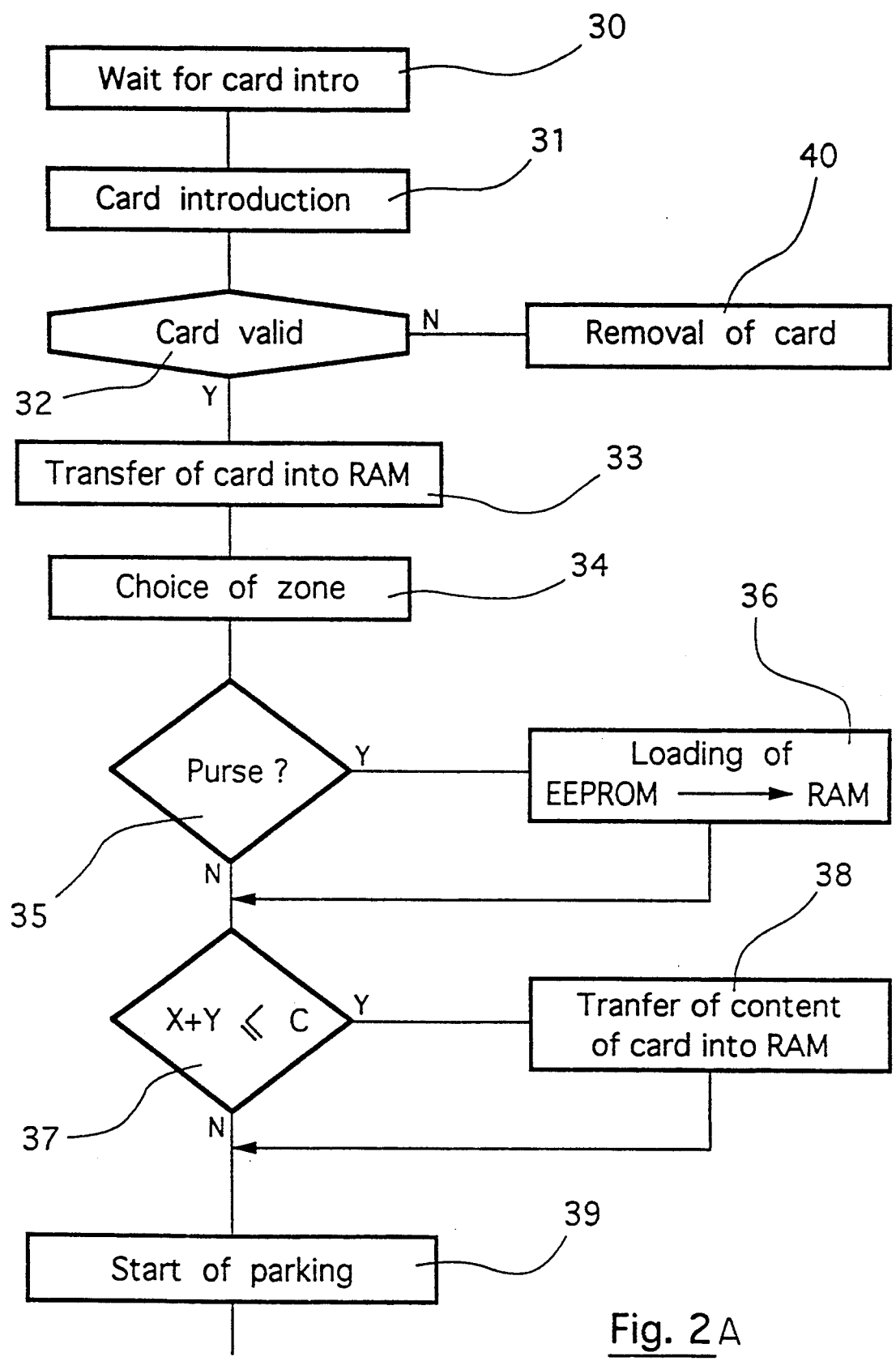
FIG. 2 is a flow chart presenting a sequence of steps of operation for a system according to the invention.
Figure 2B:
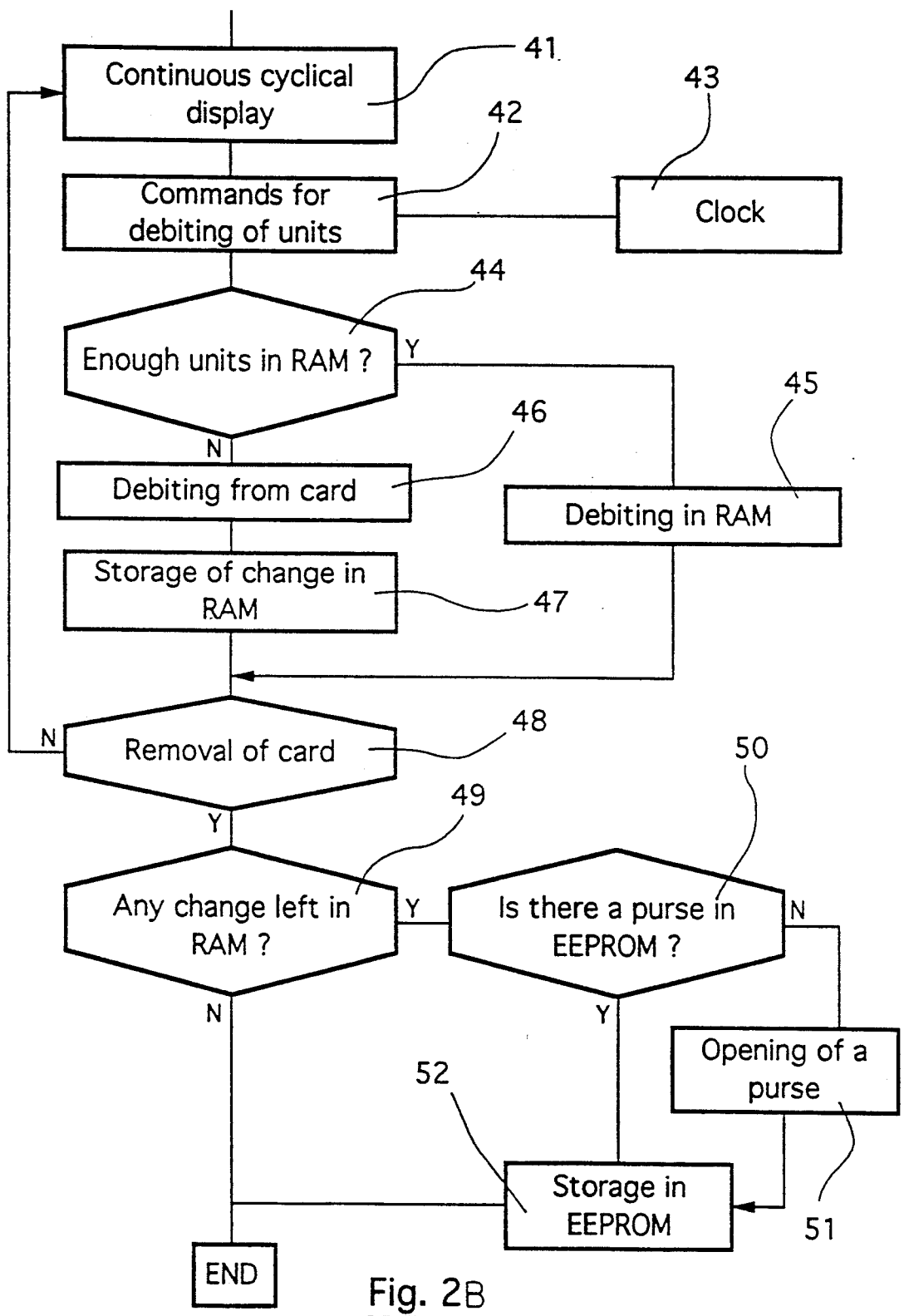

FIG. 2 is a flow chart representing the working of the accounting system for parking units of FIG. 1, in relation to the characteristics of the invention.

In the sequence of the operating steps, the apparatus starts by being in the waiting state 30, pending the introduction of a card. When a card is inserted (step 31), it tests the validity of the card (step 32) and sends out a request for removal (step 40) appearing on the display means 19 when the box does not recognize the inserted card.

If the card is recognized, its card is copied out into the RAM 12 (step 33) to limit the number of access operations to the card. The contents of the transferred card include for example notably the code of the city that has issued it, the parking zones of the city in which the card can be used, along with the description of their times and fee rates, various codes and data elements, and the credit of parking time units.

In the step 34, the user sets up a dialog with the box, notably by means of the keys 15, 16, to define notably the zone in which he is parked.

The apparatus then carries out two automatic operations:

it ascertains (35) that there is a "purse" in the EEPROM 14 for the city associated with the parking operation, namely the city that has issued the card inserted into the box. If this is so, the apparatus loads (36) the content of the EEPROM 14 into the RAM 12 so as to enable the subsequent use of its units contained in the purse;

the apparatus verifies (37) whether sum total of the contents of the purse associated with the city, with the contents of the card inserted into the box, is smaller than the maximum capacity of the purse. If this is the case, the apparatus transfers (38) the content of the card into the RAM, adds it up in the RAM 12 with the contents of the purse, and informs the user that it has emptied the card and that this card can be replaced by a new card.

The apparatus is then available for entry into the start of parking 39.

These different steps of the initialization stage may also be permutated without going beyond the scope of the invention.

It will be noted that the capacity of the purse assigned to each city is deliberately limited to a pre-determined number of parking units. This number is preferably small; for example it is seven units.

Consequently, there can be no transfer of the balance of credit contained in the card inserted into the box unless the total of the units of the purse in the RAM is smaller than the maximum capacity permitted. The amount of the transferrable balance is therefore all the smaller as there already exist units in the purse, for example resulting from a prior use of the box in the same city.

Naturally, if the purse associated with the city is empty, or again if there is no purse for this city, the threshold of transfer of the contents of the card is identical to the maximum capacity of the purse.

In a parking stage, the display unit 19 gives, for example continuously, a cyclical display 41. The following are, for example, displayed cyclically: the current time, the time of commencement of the parking, the parking limit time permitted for the zone considered, the number of payment credit units available in the element 25 and the selected parking zone. These data elements enable checking on the validity of the parking, both for the user and for the parking wardens.

Periodically, the system receives commands 42 for the debiting of parking units, under the control 43 of the clock controlled by the quartz 21.

These debiting commands are carried out as a function of parking regulations for the city considered: these regulations will have been given to the RAM 12 of the microcontroller 11 during the introduction of the card (step 33).

For example, during the effective parking of the vehicle, the ASIC 18 activates the microcontroller 11 every minute so that it applies the parking regulations.

At each command for a debiting of units, the apparatus makes a priority check to ascertain whether the purse assigned to the city and loaded in the RAM 12 contains a sufficient number of units to carry out the debiting command (step 44). If this is so, the debit is done (45) directly in the RAM 12 without gaining access to the card 25.

If not, the box directly activates the destruction of the memory positions in the card 25.

As the case may be, in one variant of the invention, the microcontroller 11 may routinely consume all the contents of the purse of the city, then debir the necessary complementary portion in the card 25.

One characteristic of the invention is that it enables the management of fractions of parking units.

This possibility proves to be a promising one in the following case: a user may purchase units, for example at a rate of one French franc per unit. He therefore pays fifty francs for a fifty-unit card. Assuming that the parking regulations of the city stipulate a charge of seven francs per hour, if the user parks for half an hour, he would have to be charged 3.50 francs. Now, without any specific system, it is not possible to take half-units of parking into account.

This drawback may be resolved, through the invention, by providing for the management of the fractions of parking units in the purse associated with the city. Advantageously, this purse is capable of taking 1/256 parking units into account for example.

In this case, after the operation of debit 46 from the card, there is a possibility of storage 47 of remaining change in the purse. This change gets added to the units or fractions of units that may be already present, so as to increase the contents.

The consumption of parking units is done periodically, so long as the apparatus does not detect any withdrawal 48 of the card from the box.

In the event of withdrawal, the apparatus ascertains first of all that there is change remaining in the purse in the RAM 12 (step 49).

If such is the case, it then checks whether a purse has been opened in the EEPROM 14 for the city considered (step 50).

If this is the case, the amount of the purse is recorded in the EEPROM, in place of the former amount.

By contrast, if no purse has been created for the city considered in the EEPROM, the apparatus will proceed to an operation for opening the purse 51.

Since the EEPROM has limited capacity, the system of the invention advantageously reserves a limited number of compartments in the EEPROM, each designed to receive a purse for a distinct city.

Figure 3:
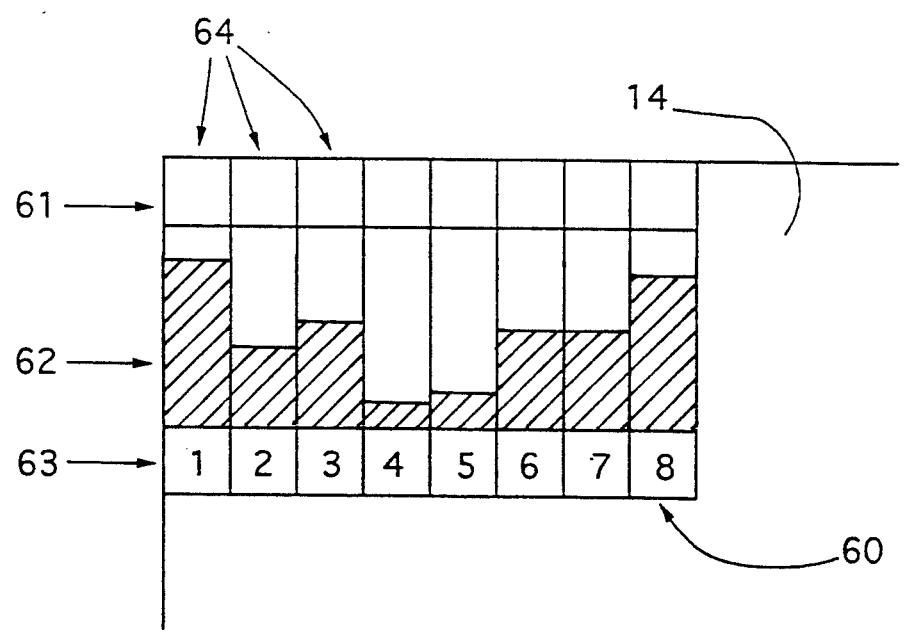
FIG. 3 gives a schematic view of the partition of a portion of the EEPROM memory, of the system of FIG. 1, into compartments for the storage of parking units and fractions of parking units (purse function) for eight distinct cities.

FIG. 3 gives a schematic view of the partition of a portion 60 of the EEPROM 14 of the system of FIG. 1, forming a parking units storage memory, into compartments 64 for the storage of units and fractions of units (purse function) for 8 distinct cities. More precisely, each compartment 64 comprises:

an identifier 61 of the city (area of validity) for which the compartment has been reserved;

a location 62 for the storage of the parking units and fractions of parking units saved (represented schematically by a "filling level");

an indicator of "newness" 63 of the compartment, the function of which shall be described in detail further below.

When a parking operation is initialized for a city possessing a "purse" 64 in the EEPROM 14, the content of the location 62 is duplicated in the RAM 12 (step 36 of FIG. 2), and acts as an ancillary memory with limited capacity for the management of the card emptying operation and of the use of fractions of units.

The fact that there is a limited number of compartments implies the management of the borderline case where, during the withdrawal of a card, the system asks for the opening of a new compartment whereas all the compartments already contain assigned purses.

This therefore implies that a purse is eliminated so as release a compartment.

The invention includes all the embodiments that can be used to choose the compartment to be released.

Advantageously, the elimination can be done by taking at least one of the following criteria into account:

the length of time since the opening of the purse, the frequency of use of the purse, i.e. the frequency with which the purse is copied out from the EEPROM into the RAM, and vice-versa;

the contents of the purse, so as to eliminate the purse having the smallest balance, and even a zero balance.

Advantageously, this taking account of the different criteria is done by a management in the EEPROM of transaction "newness of presence" indicators each associated with a distinct compartment. These indicators are, for example, simply constituted by a figure of 1 to 8, the figure getting ever smaller as the transaction gets older than the others. Thus, if it is assumed that eight compartments have been reserved in the EEPROM for the storage of the purses, it is possible to work as follows for each withdrawal of the card:

if there is no purse for the city considered, the purse relating to the earliest used city is ejected, and all the indicators are "aged" (for example by decrementation) so as to assign the "youngest" indicator to the new purse;

if there already exists a purse in EEPROM for the city corresponding to the card that has just been drawn from the box, the "youngest" indicator is assigned to this purse and the indicators of the other purses are "aged" as the case may be. More precisely:

no indicator will be "aged" if the purse has already been in the "youngest" position before the parking that has just been completed;

in the other cases, the only indicators to be "aged" will be indicators of transactions more recent than those related to the previous parking in the same city, i.e. purses located between the former and the new position of the shifted purse.

This logic of arbitration corresponds, in a way, to the working of an intelligent "FIFO" memory.

In order to further optimize the system, it is possible to remove any purse that might be empty from the memory, for example by not reloading the emptied purse into the EEPROM 14, during the withdrawal of the corresponding card.

What is claimed is:

1. An accounting system for consumable units, notably an accounting system for parking time units, of the type comprising:

a consumable card or element comprising an electronic memory that stores a credit of consumable parking units, and a box for the reception of said card comprising, firstly, means for the irreversible writing of the memory positions of the electronic memory of said card and, secondly, an ancillary management memory, capable of collecting consumable parking units through said writing means, wherein the storage capacity of said management memory of the box is limited to a maximum number of pre-determined parking units, and wherein transfer means provide for the transfer of the balance of parking units contained in the card towards said management memory of the box when the arithmetical total of the number of added-up units of said card balance and of the current content of said management memory of the box is smaller than or equal to said capacity of the management memory.

2. A system according to claim 1, wherein said writing means effects said consumption of parking units as a function of preconfigurable parameters, wherein said preconfigurable parameters are capable of stipulating the consumption of fractions of consumable parking units, and wherein the unconsumed fractions of parking units are stored in said management memory.

3. A system according to claim 2, wherein said writing means of the box consume, on a priority basis, the parking units and/or fractions of parking units contained in said management memory, before consuming the parking units contained in said card.

4. A system according to claim 2, wherein said preconfigurable parameters belong to the group comprising the following: elapsing of time, an area of validity of the card, a given zone among several zones divided out in said area of validity of the card.

5. A system according to claim 4, wherein said preconfigured parameters are given by at least one means belonging to the group comprising the following: permanent data in the card, permanent data in the box and data programmable by the user.

6. A system according to claim 1, of the type capable of working distinctly for different areas of validity, said system including an electronic storage memory comprising a predetermined number of distinct storage compartments, each of said compartments being capable of being assigned to the storage of the parking units and/or fractions of parking units relating to an operation for a distinct area of validity.

7. A system according to claim 6, comprising at least as many distinct types of cards as distinct areas of validity, each card containing a code representing its area of validity.

8. A system according to claim 7, wherein said storage memory with compartments is set up in FIFO mode so that, when the number of areas of validity for which parking units and/or fractions of parking units that are to be stored exceeds the number of compartments of said memory, said memory eliminates the storage of parking units or fractions of parking units from the compartment corresponding to the area of validity that:

has had the most long-standing presence in the memory of the box, and/or comprises the smallest number of memorized units, and/or has the lowest frequency of use.

9. A system according to claim 8, wherein each of said compartments is referenced by an indicator of "newness of presence" in the EEPROM, the number of the indicator representing the "oldness" of the last use of the corresponding compartment in relation to the other compartments, and wherein, in the event of excess, the compartment assigned the indicator representing the greater degree of oldness is released.

* * * * *